UNITED STATES PATENT OFFICE.

HANS FOERSTERLING AND HERBERT PHILIPP, OF PERTH AMBOY, NEW JERSEY, ASSIGNORS TO THE ROESSLER & HASSLACHER CHEMICAL COMPANY, OF NEW YORK, N. Y., A CORPORATION.

PROCESS OF MAKING UREA.

No. 796,713.     Specification of Letters Patent.     Patented Aug. 8, 1905.

Application filed February 11, 1904. Serial No. 193,100.

*To all whom it may concern:*

Be it known that we, HANS FOERSTERLING, a subject of the Emperor of Germany, and HERBERT PHILIPP, a subject of the King of Great Britain, both residents of Perth Amboy, county of Middlesex, State of New Jersey, have invented a certain new and useful Process of Manufacture of Urea, of which the following is a specification.

This invention relates to a new and useful process of manufacture of urea based upon the reaction of a cyanamid metallic salt in the presence of an acid.

The present methods of manufacture of urea are not only expensive and complicated, but also give low yields of urea. The majority of methods used involve a converting a cyanate metallic salt into ammonium cyanate and letting this undergo a molecular change, which gives by no means very high results.

In our invention we use a cyanamid-metallic salt, which is much cheaper and more easily attainable than the chemicals heretofore used for this purpose.

Our process of manufacture is as follows: A concentrated solution of sodium cyanamid is slowly introduced into any acid, preferably sulfuric acid on account of its cheapness. The sulfuric acid is agitated while the sodium-cyanamid solution is being introduced, as the reaction is very vehement and must not be allowed to localize, as it would then be liable to eject the contents of the vessel. The reaction with concentrated sulfuric acid is so vehement that it is preferable to use a more dilute acid. It is essential that the sodium-cyanamid solution should be added to the sulfuric acid, and not vice versa, and that the amount of acid should be such that when all the portion of the sodium cyanamid has been added the liquid still remains on the acid side, which can from time to time during the process be ascertained by testing with litmus-paper. Should the solution through lack of acid become alkaline, then part of the cyanamid is converted into dicyanamid. The yield of urea is greatly diminished and is very hard to get in a pure form, as small portions of dicyanamid constantly remain in the urea crystals. The reaction takes place in two phases—

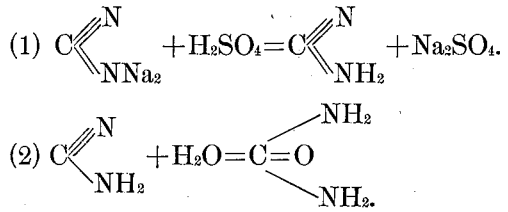

When the sodium-cyanamid solution is introduced into the acid, the cyanamid which is formed is instantaneously further decomposed into urea and can be easily and conveniently separated from the sodium sulfate by fractional crystallization or by extraction with a convenient solvent, and good yields are obtained. If the acid is introduced into the sodium-cyanamid solution, which is alkaline, as per following equation,

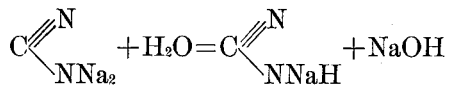

then the cyanamid, which is set free, is liable on account of its unstable properties to be destroyed, and the amounts of urea obtained are very small.

The foregoing process may be varied by bringing together a solution of cyanamid metallic salts and an acid and cooling the same, whereby cyanamid is formed, then adding a slight excess of acid and heating the solution, whereby urea is formed. It is obvious that other variations may be practiced in carrying out the process above described.

It may be remarked that it is not necessary to confine this process to the use of the sodium salt of cyanamid and sulfuric acid, but any suitable mono or di metallic salt of cyanamid or free cyanamid may be used, and any suitable acid may be used for the reaction.

What we claim as our invention, and desire to secure by Letters Patent is—

1. A process for the manufacture of urea from cyanamid metallic salts comprising the introduction of the cyanamid metallic salts into a mineral acid, substantially as herein described and set forth.

2. A process for the manufacture of urea from cyanamid metallic salts comprising the introduction of the cyanamid metallic salts into sulfuric acid, substantially as herein described and set forth.

3. A process for the manufacture of urea from di-sodium cyanamid comprising the introduction of the di-sodium cyanamid into sulfuric acid, substantially as herein described and set forth.

4. A process for the manufacture of urea from di-sodium cyanamid comprising the introduction of a solution of di-sodium cyanamid into sulfuric acid, the sulfuric acid being in such quantities that the resulting liquid remains on the acid side, substantially as herein described and set forth.

5. A process for the manufacture of urea which consists in reacting on a cyanamid metallic salt with a mineral acid and maintaining a suitable temperature to form cyanamid; then adding a mineral acid to the cyanamid solution and heating the same, whereby urea is produced, substantially as described.

6. A process for the manufacture of urea which consists in reacting on a cyanamid metallic salt with sulfuric acid and maintaining a suitable temperature to form cyanamid; then adding sulfuric acid to the cyanamid solution and heating the same, whereby urea is produced, substantially as described.

7. A process for the manufacture of urea which consists in reacting on di-sodium cyanamid with sulfuric acid and maintaining a suitable temperature to form cyanamid; then adding sulfuric acid to the cyanamid solution and heating the same, whereby urea is produced, substantially as described.

In witness whereof we have hereunto signed our names in the presence of two subscribing witnesses.

HANS FOERSTERLING.
HERBERT PHILIPP.

Witnesses:
   FRANZ ROESSLER,
   MILTOUKUTZ.